United States Patent [19]

Frohman-Bentchkowsky

[11] 3,744,036

[45] July 3, 1973

[54] ELECTRICALLY PROGRAMMABLE READ ONLY MEMORY ARRAY

[75] Inventor: Dov Frohman-Bentchkowsky, Los Altos, Calif.

[73] Assignee: Intel Corporation, Mountain View, Calif.

[22] Filed: May 24, 1971

[21] Appl. No.: 146,358

[52] U.S. Cl. .............................. 340/173 R, 307/317

[51] Int. Cl. .............................. G11c 11/40

[58] Field of Search .............................. 340/173 R; 307/317–319

[56] References Cited

UNITED STATES PATENTS

| | | | |
|---|---|---|---|
| 3,500,142 | 3/1970 | Kahng | 340/173 R |
| 3,387,286 | 6/1968 | Dennard | 340/173 R |

*Primary Examiner*—Terrell W. Fears

*Attorney*—Spensley, Horn and Lubitz

[57] ABSTRACT

An electrically programmable semiconductor read only memory array which utilizes a floating gate metal-oxide-semiconductor (MOS) device as a storage element is described. The floating gate of the device (storage element) may be negatively charged by avalanche injection. A field effect transistor is coupled in series with the storage element to form a single memory cell. A plurality of cells comprise an array. The gate of the field effect transistor is coupled to an X-line of the memory array and one of the other terminals of this transistor, in one embodiment, is coupled to a Y-line of the array. The array is electrically programmed by application of information to the X and Y lines of the array.

4 Claims, 5 Drawing Figures

DOV FROHMAN-BENTCHKOWSKY
INVENTOR

BY Spensley, Horn & Lubitz
ATTORNEYS

DOV FROHMAN-BENTCHKOWSKY
INVENTOR

BY Spensley, Horn & Lubitz
ATTORNEYS

ELECTRICALLY PROGRAMMABLE READ ONLY MEMORY ARRAY

BACKGROUND OF THE INVENTION:

1. Field of the Invention

The invention relates to the field of electrically programmable read only semiconductor memories.

2. Prior Art

Electrically programmable semiconductor read only memories have received considerable attention in recent years. The search for a nonvolatile semiconductor storage device, that is, one where retention of stored information is achieved without an external power source, stems from the inadequacy of mask programmable read only memories (ROM's) in meeting the demands of periodic program changes in computer microprogramming applications and in the design phase of general purpose computers. The development of new masks to implement these changes requires, in addition to the large costs, a considerable period of time. Another aspect of this search is the need for a semiconductor memory element that can provide a substitute for the nonvolatile storage capability of magnetic memories.

The proposed prior art electrically programmable semiconductor memories can be divided into two main categories. 1) Fusible link ROM's in which a permanent (irreversible) change in the memory interconnection pattern is affected by an electrical pulse or by mechanical scratching. 2) Alterable ROM's in which a reversible change in active device characteristics is induced electrically. The fusible type ROM's (which cannot be reprogrammed) are mainly bipolar memories with capacities up to 512 memory bits.

Most proposed prior art alterable ROM's rely on charge storage in a dielectric which forms part of the gate of a field effect transistor. Feasibility has been demonstrated for a MNOS (metal-nitride-oxide-silicon) memory (H.A. Wegener, "MNOS Memories," Digest of the Intermag Conference, April, 1970; D. Frohman-Bentchkowsky, "An Integrated Metal-Nitride-Oxide-Silicon [MNOS] Memory," Proc. IEEE [Letters], Vol. 57, pp. 1190–1192, June 1968), an MAS (metal-aluminum-oxide-silicon) memory (S.Nakamuma, T. Tsujide, R. Igarachi, K. Onoda, T. Nada, and M. Makagiri, "A Read-Only Memory Using MAS Transistors," ISSCC Digest of Technical Papers, pp. 68,069, February 1970) and a dual gate MNOS memory (H.G. Dill and T.N. Toombs, "A New MNOS Charge Storage Effect" Solid State Electronics, Vol. 12, pp. 981–987, 1969). Due to difficulties in controlling the storage dielectrics during manufacturing and the lack of the on-the-chip decoding, the realization of these approaches so far has been limited to undecoded memory arrays of up to 256 bits. Recently the feasibility of the ovonic amorphous semiconductor memory device has been demonstrated by fabrication of an undecoded 256 bit memory array. (R.G. Neale, D.L. Nelson and G.E. Moore, "Amorphous Semiconductors [Part 1]," Electronics, September 1970).

The present invention describes a memory array which has been proven successful in a 2,048 bit electrically programmable read only memory (fully decoded) implemented with a floating gate storage transistor as the nonvolatile memory element. The memory array which has been proven successful is organized as 256 words of 8 bits and can be operated in both the static or dynamic decoding and sensing mode. The array was successfully fabricated with silicon gate MOS technology yielding functional devices with access times below 800 nanoseconds in the static mode and less than 500 nanoseconds in the dynamic mode of operation.

SUMMARY OF THE INVENTION

An electrically programmable read only memory which utilizes semiconductor components is described. The memory array contains a plurality of X lines and Y lines to which the memory cells are coupled. Each memory cell utilizes a floating gate MOS device as a storage element. The floating gate transistor in the presently preferred embodiment comprises a P-channel silicon gate MOS field effect transistor in which no electrical contact is made to the floating silicon gate. The floating gate is isolated from the substrate by silicon oxide. A charge which represents the stored information is transferred to the floating silicon gate when an avalanche injection condition is reached in either the source or drain junction of the floating gate transistor, or a surface of said device. A field effect transistor having a gate and at least two other terminals is utilized to couple each storage element to an X line or Y line. In one embodiment the gate of the field effect transistor is coupled to an X line and one of its other terminals, that is, the source or drain, is coupled to a Y line. The other terminal of the field effect transistor is coupled to one terminal of the floating gate device and the other terminal of the floating gate device is coupled to ground. The storage elements (floating gate devices) in the array are programmed by selectively charging the floating gates of the storage elements. More specifically, the storage elements located at line $X_1$ and $Y_1$ may be charged by the application of a negative voltage to these lines simultaneously while the other lines of the array are grounded. To read information from the position $X_1$, $Y_1$ a negative pulse of smaller magnitude than the one utilized to write the information into the storage element is applied to lines $X_1$ and $Y_1$ and the information is read out of the array.

DETAILED DESCRIPTION OF THE INVENTION:

An electrical programmable read only memory array which utilizes semiconductor components is described. The array may be manufactured utilizing known semiconductor technology and in the preferred embodiment the array utilizes MOS components in an integrated circuit.

Figure 1:
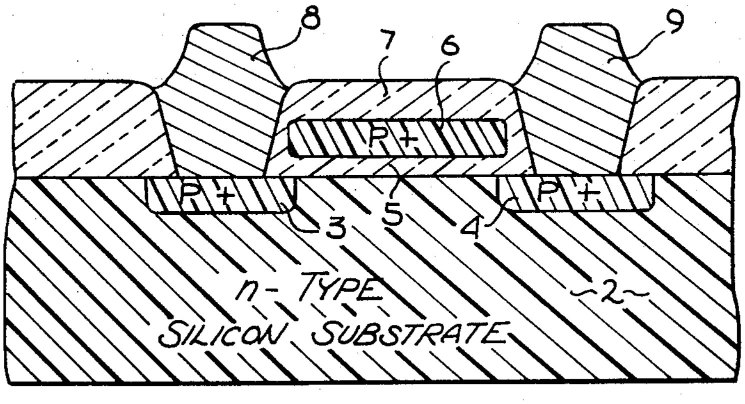
FIG. 1 is a cross-sectional view of the storage element used in the read only memory arrays described herein and comprises an MOS floating gate, field effect device.

The storage element, a plurality of which is utilized in the array, is the floating gate device illustrated in FIG. 1. In the presently preferred embodiment the floating gate device comprises a metal oxide semiconductor (MOS) device. The device fabricated on an N-type silicon substrate 2 includes two spaced apart $P^+$ regions 3 and 4 (source and drain). A floating gate 6, which in the presently preferred embodiment is a $P^+$ polycrystalline silicon, is disposed between the regions 3 and 4 and is insulated from the substrate by insulative layer 5. The regions 3 and 4 are utilized as terminals for the storage element and are hence coupled to metal contacts 8 and 9, respectively. A second insulative layer 7 is disposed above the gate 6 such that the gate 6 is completely insulated. The insulative layers 5 and 7 in the presently preferred embodiments comprise silicon oxide (e.g. SiO, $SiO_2$). For a complete description and discussion of the storage element, see co-pending application Ser. No. 46,148, filed June 15, 1970 and co-pending Continuation-In-Part application Ser. No. 106,642, filed Jan. 15, 1971, both assigned to the assignee of the present application.

Information is stored on the floating gate of the storage element in the form of a negative electrical charge. The charge may be transferred to the floating gate when an avalanche injection condition is reached in either junction (source or drain) defined by the two regions and the channel of the storage element. The charge once placed on the floating gate remains there permanently unless removed by techniques explained in the above-referenced patent applications. Studies have indicated that sufficient charge to operate the array will remain on the floating gate for periods in excess of 10 years, even at temperatures of 125° C.

For the purposes of discussion herein it will be assumed that a "1" state is the state where no appreciable charge exists on the floating gate of the storage element and thus the storage element will not readily conduct a current between its terminals. The "0" state as utilized herein indicates that a charge exists on the floating gate of sufficient magnitude to cause a more conductive path to exist between the terminals of the storage elements.

Figures 2, 3, 5:
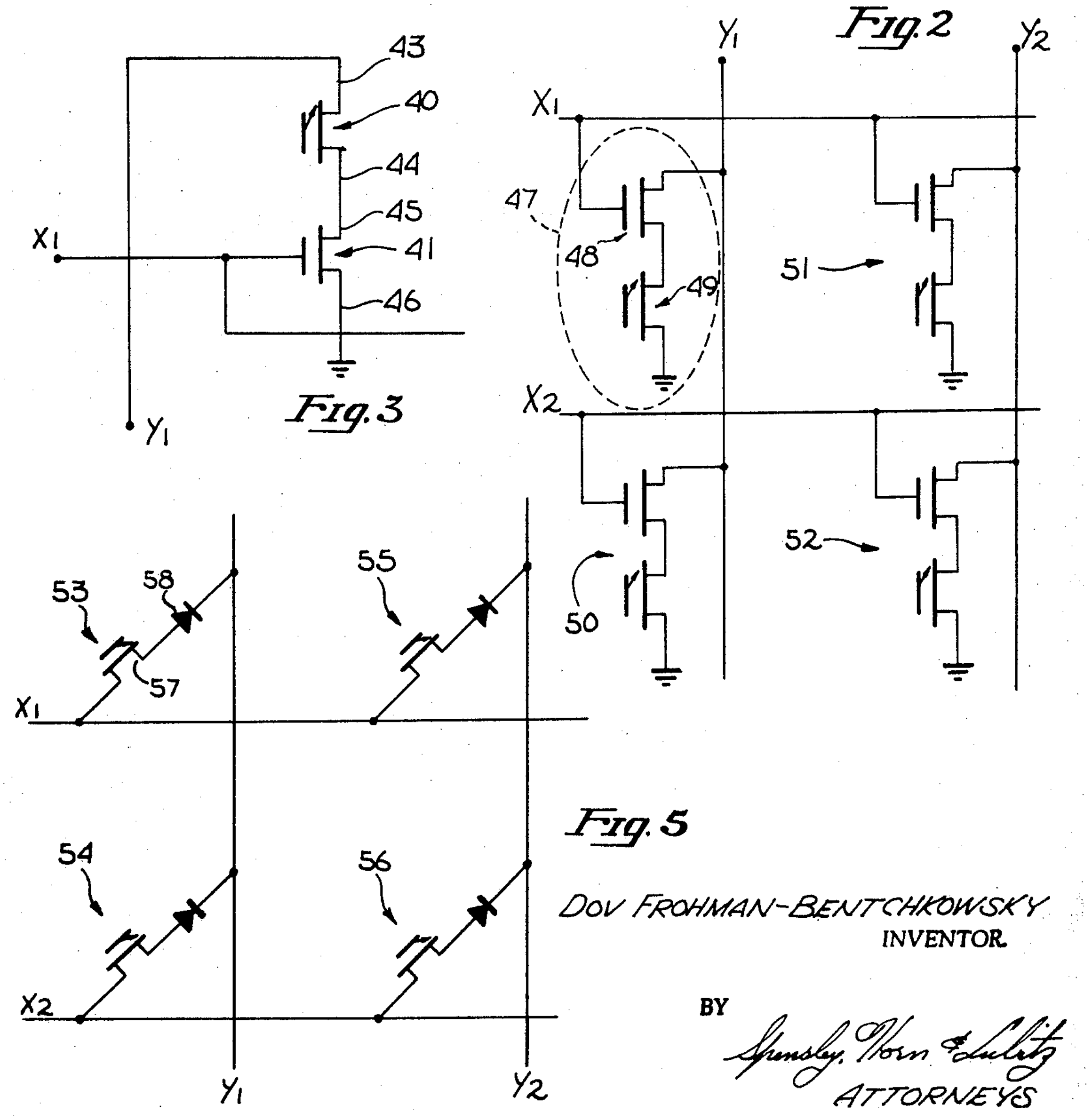
FIG. 2 is a circuit diagram illustrating a portion of a memory array built in accordance with the present invention.
FIG. 3 is a circuit diagram for an alternate embodiment of a single memory cell which may be utilized in the array of FIG. 2.
FIG. 5 is a circuit diagram of an alternate embodiment of a memory array wherein a diode is utilized with each memory cell.

Referring to FIG. 2, a portion of a memory array comprising X lines $X_1$ and $X_2$ and Y lines $Y_1$ and $Y_2$ and memory cells 47, located at position $X_1$, $Y_1$, memory cell 50 located at position $X_2$, $Y_1$, memory cell 51 located at $Y_1$, $Y_2$ and memory cell 52 located at $X_2$, $Y_2$ is illustrated. Memory cells 47, 50, 51 and 52 may be identical and each comprises a storage element such as the device shown in FIG. 1 and an isolation means which comprises a field effect transistor. For example, memory cell 47 comprises a field effect transistor 48 and a storage element, floating gate device 49. The gate of transistor 48 is coupled to line $Y_1$ and one of the other two terminals of that field effect transistor is coupled to line $Y_1$. One terminal (source or drain) of the device 49 is coupled to the other terminal of transistor 48 and the other terminal of the device 48 is coupled to ground. While only a portion of an array is illustrated in FIG. 2, it will be obvious that the array may be of any size and contain any number of memory cells along its X lines and Y lines.

In the presently preferred embodiment the array of FIG. 2 comprises P-channel MOS field effect devices and transistors which utilize a silicon gate. The array of FIG. 2 may be manufactured using known MOS technology.

In order to program the array of FIG. 2, assume first that all the storage elements such as device 49 are in their "1" state. Assume further that it is necessary to write a "0" into position $X_1$, $Y_1$, that is, to place a negative charge on the floating gate of device 49. In order to do this a negative voltage is applied to lines $X_1$ and $Y_1$ while the remaining X-lines in the array are grounded. When the negative voltage is applied to lines $X_1$ and $Y_1$ transistor 48 will be turned on and the negative voltage applied to line $Y_1$ will be sensed by device 49. This will cause an avalanche condition in one of the junctions of device 49, thereby charging the floating gate of that transistor. In practice a voltage in the order of minus 35 volts is required to cause the avalanche injection. Note that the other memory cells located along line $X_1$ may be programmed simultaneously with the programming of memory cell 47. Thus by the selective application of voltages to the X and Y lines of the array of FIG. 2 it is possible to program the array with "1"s and "0"s as desired. As previously mentioned, once a storage element is programmed with an "0" it will remain programmed for a long period of time.

In order to read information from the array of FIG. 2, assume it is necessary to determine the state of the information stored in position $X_1$ and $Y_1$. A negative voltage is applied to line $X_1$, thereby turning on transistor 48. If a "0" has been stored within device 49 a current path will exist from line $Y_1$ through transistor 48 and device 49 to ground. The existence of this condition may be sensed by negatively precharging line $Y_1$ and sensing the fact that line $Y_1$ goes to ground potential. If device 49 is in a "1" state no current path will exist between its terminals and thus no current path will exist between line $Y_1$ and ground. Note that the voltage utilized to read out information from the array of FIG. 2 must be of smaller magnitude than the voltage utilized to program the array in order to avoid avalanching any of the floating gate devices during the read cycle. Referring to FIG. 3, an alternate embodiment of memory cell 47 of FIG. 2 is illustrated. The cell again comprises a floating gate device 40 which may be similar to the device illustrated in FIG. 1, and a field effect transistor 41 which may be similar to the field effect transistor 48 of FIG. 2. This cell may be utilized in the array of FIG. 2 with terminal 43 of the floating gate device 40 coupled to line $Y_1$ while the other terminal 44 of that device is coupled to terminal 45 of the field effect transistor 41. The other terminal 46 of transistor 41 is coupled to ground. The gate of transistor 41 which is coupled to line $X_1$ would also be coupled to the gates of the other field effect transistors located along line $X_1$.

When the memory cell illustrated in FIG. 3 is utilized in the array of FIG. 2 in place of the memory cells illustrated in FIG. 2, the write cycle and read cycle above described are again utilized to program the array and to read information from the array.

It has been found that when the memory cell shown in FIG. 3 is utilized in lieu of the memory cells shown in the array of FIG. 2 that a lower voltage may be used to write information into the cells, that is, a lower voltage may be used to achieve the avalanche injection condition used to transfer electrons onto the floating gate of the memory storage devices, such as device 40. This is so since the voltage drop across the source to drain terminals of transistor 41 (FIG. 3) is less than the voltage drop across the source to drain terminal of transistor 48 (FIG. 2), because the source terminal of transistor 46 is grounded. Thus, when a negative voltage is applied to a selected Y line such as $Y_1$ (FIG. 3) for the embodiment of the memory cell shown in FIG. 3, more of this voltage appears across the device 40 (FIG. 3) as compared to the voltage that would appear across device 49 (FIG. 2) if the same negative voltage were applied to line $Y_1$ (FIG. 3).

Figure 4:
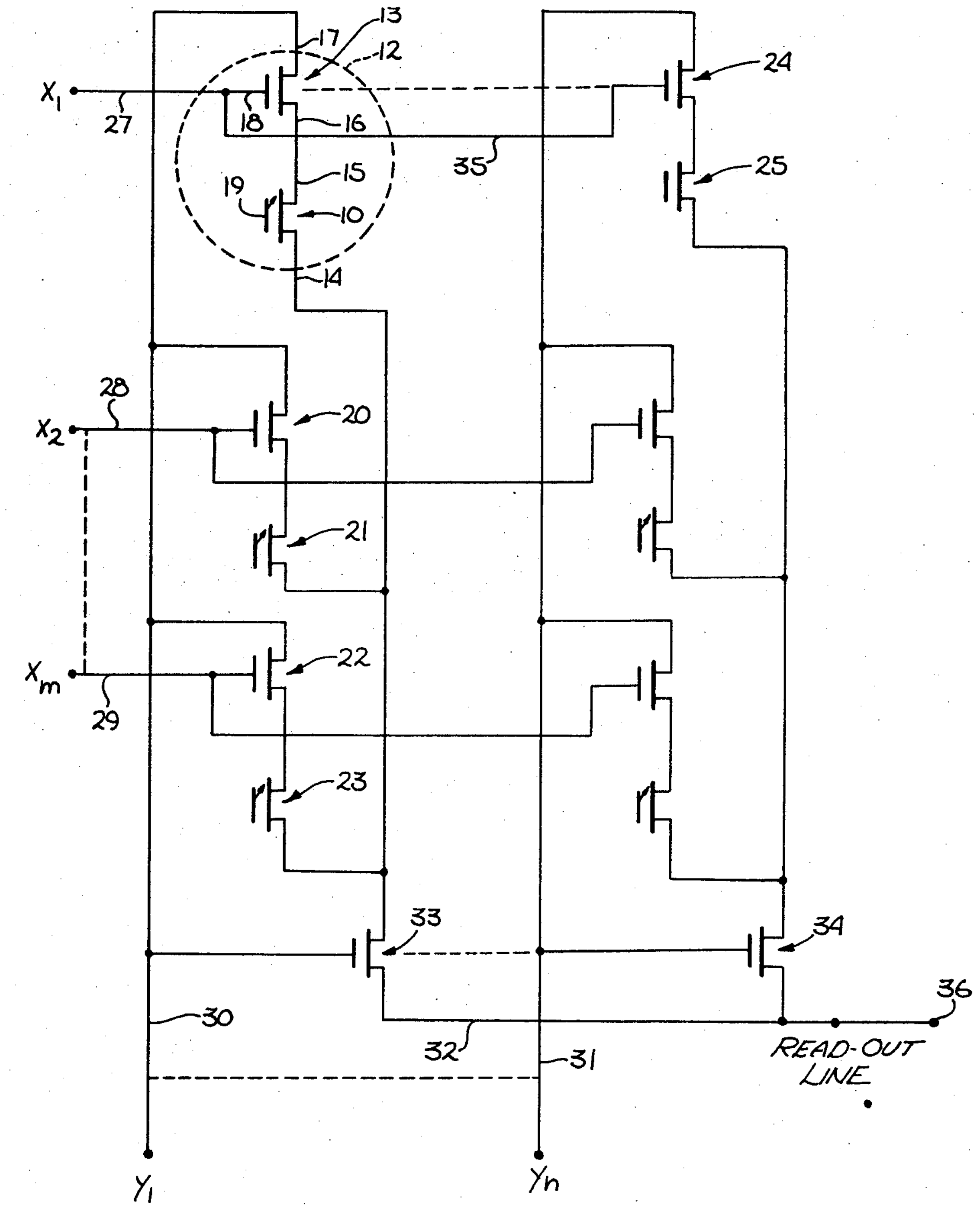
FIG. 4 is a circuit diagram of an alternate embodiment of the memory array of FIG. 1 which includes a read-out line.

Referring to FIG. 4, an alternate embodiment of the memory array of FIG. 2 is illustrated wherein a separate read-out line is included in the array. This array includes a plurality of X-lines, $X_1$, $X_2$ and $X_n$, identified as lines 27, 28 and 29, respectively, and a plurality of Y-lines, $Y_1$ and $Y_n$, designated as lines 30 and 31, respectively. Dotted lines are indicated in FIG. 4 between lines $X_2$ and $X_n$ to indicate that any number of X-lines may be included in the array. Likewise, a dotted line is illustrated between lines $Y_1$ and $Y_n$ to indicate that any number of Y-lines may be utilized in the array. The lines $X_1$, $X_2$, $X_n$ and $Y_n$ are conductive paths for electrical signals. Information is read out of the array on the read-out line 32 which terminates in terminal 36, said line also being a conductive path.

A single memory cell 12 coupled to lines $X_1$ and $Y_1$ is illustrated within the dotted circle of FIG. 4 and comprises a field effect transistor 13 and a floating gate device 10. Device 10 may be similar to the device shown in FIG. 1. Likewise a memory cell is coupled to lines $X_2$ and $Y_1$, that cell comprising field effect transistor 20 and floating gate device 21. A cell comprising field effect transistor 22 and floating gate device 23 is coupled to line $X_n$ and $Y_1$. Similarly, a memory cell comprising field effect transistor 24 and floating gate device 25 is coupled to lines $X_1$ and $Y_n$. Note that all the memory cells in the array are of the same construction. It will be obvious to one of ordinary skill in the art that anp size array may be built utilizing the interconnections illustrated in FIG. 4.

Referring more specifically to memory cell 12, field effect transistor 13 which includes a gate terminal 18 and two other terminals 16 and 17 (often referred to as a source and drain) has its gate terminal 18 coupled to line $X_1$. The floating gate device 10 includes two terminals 14 and 15 with terminal 15 coupled to terminal 16 of the field effect transistor 13. The terminal 14 of the floating gate device 10 is coupled to one terminal of transistor 33. The gate 18 of transistor 13 also is coupled to the gate of the field effect transistor 24 by lead 35. If additional memory cells are illustrated along line $X_1$ each of the gates of the field effect devices associated with each of the memory cells would be coupled to line $X_1$. It should be noted that each of the memory cells along line $Y_1$ would have one terminal of its field effect transistor such as transistors 20 and 22 coupled to line $Y_1$. As in the case of the previously described memory cells the field effect transistor such as transistors 13, 20, 22 and 24 serve as isolation means allowing the storage element (floating gate device) associated with each of these transistors to be isolated.

The read-out line 32, which is coupled to terminal 14 of device 10, is likewise coupled to one terminal of the floating gate devices 21 and 23 through a field effect transistor 33. The field effect transistor 33, which includes a gate terminal which is coupled to line $Y_1$ and two other terminals, one of which is coupled to line 32, allows the read-out line to be selectively isolated from line $Y_1$ during the write and read cycles which will be described herein in detail. In a similar manner the gate of transistor 34 is coupled to line $Y_n$ and one terminal of transistor 34 is coupled to one terminal of floating gate devices of each memory cell located along line $Y_n$. The other terminal of transistor 34 is coupled to the read-out line 32.

The array illustrated in FIG. 4 may be electrically programmed, that is, the various floating gates such as floating gate 19, may be electrically charged in what is referred to herein as the write cycle. Assume it is desired to write a "0" in position $X_1$, $Y_1$, that is, to place a negative charge on gate 19 of memory cell 12, a negative voltage would be simultaneously applied to lines $X_1$ and $Y_1$ while the other lines of the array such as $X_2$, $X_n$ and the read-out line 36 are held at ground potential. (Note that it is assumed that all the floating gates of the array are in the "1" state when the programming begins.) The negative voltage applied to line $X_1$ and to gate terminal 18 will cause a conductive path to exist between the terminals 16 and 17 of the field effect transistor 13 (assuming such to be a P-channel device). When this occurs the negative voltage applied to line $Y_1$ is transmitted to terminal 15 of the floating gate device 10. Note that terminal 14 of the device 10 is close to ground potential since the transistor 33 (assuming such to be a P-channel device) is turned on by the negative voltage applied to its gate and since lead 32 is at ground potential. Under these conditions the junction of the floating gate device 10, which is coupled to terminal 15, will avalanche and negatively charge the floating gate 19. When this occurs a permanent charge is retained on the floating gate 19 and thus the device 10 is placed in the "0" state. In a similar manner a "0" may be programmed into any of the other memory cells in the array. None of the other floating gates located along line $Y_1$, such as the floating gate associated with devices 21 and 23, will be charged since transistors 20 and 22 respectively will not conduct when their gates are at ground potential. The negative voltage applied to lines $X_1$ and $Y_1$ must be of sufficient magnitude to cause an avalanche condition in device 10. In the presently preferred embodiment wherein P-channel MOS devices (10, 13, 8 and 33) are utilized, a negative voltage of approximately 50 volts applied, for example, to lines $X_1$ and $Y_1$ has been found to be sufficient to cause an avalanche in one of the junctions of the floating gate device 10, thereby charging floating gate 19.

Transistor 24 will be turned on, as will all the other field effect transistors located along line $X_1$ during the part of the write cycle above described, since the negative voltage applied to line $X_1$ will be transferred to the gate of transistor 24 by lead 35. Thus, it is possible by selectively applying voltages along the other Y lines such as line $Y_n$ to simultaneously program all the memory cells located along lines $X_1$.

Information stored within the array may be read from the array without the destruction of the information controlled within the array. For example, if it is necessary to read the information stored in memory cell 12 a negative voltage is applied to lines $X_1$ and $Y_1$. This voltage is of a smaller magnitude than the voltage required to program the array during the write cycle. For example, in the preferred embodiment of the invention a negative voltage of 15 volts is utilized during the read cycle. When the negative voltage is applied to lines $X_1$ and $Y_1$ transistors 13 and 33 are turned on since the negative voltage is applied to the gates of these transistors. If a "0" is stored on transistor 10 a current path will exist through transistors 13, 10 and 33 and the voltage applied to line $Y_1$ may be sensed on the read-out line at terminal 36. On the other hand, if a "1" is stored on the floating gate 19, that is, no appreciable charge exists on that floating gate, no current path will exist between $Y_1$ and the read-out line 32 since device 10 will not have a conductive path between its terminals 14 and 15. During the read cycle, the negative voltage which is utilized is not large enough to cause an avalanche breakdown in any of the storage elements. Thus, the transistors which have been previously programmed with a "1" will remain in that state.

Referring to FIG. 5, a portion of a memory array comprising X lines, $X_1$ and $X_2$, and Y lines, $Y_1$ and $Y_2$, is illustrated. Memory cells 53, 54, 55 and 56, which may be identical, are illustrated wherein each memory cell is coupled between one X line and one Y line. Memory cell 53 comprises a floating gate device 57, which may be similar to the device of FIG. 1 and a diode 58. One terminal of the floating gate device is coupled to the line $X_1$ and the other terminal is coupled to one terminal of diode 58. The other terminal of diode 58 is coupled to line $Y_1$. The diode is oriented in the memory cell 53 such that it will pass a current in the direction from line $X_1$ to line $Y_1$. This array may also be produced as an integrated circuit utilizing known MOS technology.

In order to program the array of FIG. 5, assume first that all the memory cells are in the "1" state, that is, no charge exists on the floating gate of the storage element such as device 57. Assume further that it is necessary to program a "0" into memory cell 53. This may be accomplished by applying a negative voltage to line $Y_1$ and grounding line $X_1$. The other X lines in the array should be maintained at a negative voltage to prevent a passage of current through the other memory cells located along line $Y_1$. When the negative voltage is applied to line $Y_1$ a current will flow from line $X_1$ through device 57 and diode 58 into line $Y_1$ provided the magnitude of the voltage applied to line $Y_1$ is sufficient to cause an avalanche condition within floating gate device 57. Once this condition is achieved a charge will be permanently placed on the floating gate of device 57. In a similar manner the remaining memory cells with the array may be programmed.

In order to read information from the memory cells in FIG. 5, assume it is necessary to sense the condition of the memory cells 53 located at position $X_1$, $Y_1$. A negative voltage is applied to line $Y_1$ while line $X_1$ is grounded. The other X lines should be maintained at a negative voltage in order to avoid a passage of current through the other memory cells located along line $Y_1$. If a "0" is stored within device 57 a passage of current will be noted through line $X_1$ and $Y_1$ since device 57 will be turned on. Note as in the other embodiments discussed above, it is necessary that while reading information from the array, the negative voltage utilized to sense the state of the storage element must be of small enough magnitude to avoid avalanching within the storage elements.

Thus, a read only memory array which utilizes semiconductor components and which may be electrically programmed has been described. The arrays in the presently preferred embodiments are produced as integrated circuits utilizing MOS technology. As discussed above, once an array is programmed it should remain operative for periods in excess of ten years before it will become necessary to reprogram the array.

I claim:

1. A memory array comprising:

a plurality of X lines;

a plurality of Y lines;

at least one common line;

a plurality of memory cells, each comprising a storage device having a pair of spaced-apart P-type regions disposed in an N-type substrate and a floating gate for receiving an electrical charge from said substrate, one of said regions being coupled to one of said Y lines; and a field effect transistor having a gate, a source and a drain, said gate being coupled to one of said X lines, said source being coupled to said other region of said storage device and said drain being coupled to said common line; and voltage means for applying a negative voltage to at least one of said Y lines of sufficient magnitude to cause an avalanche condition in said storage device, thereby causing an electrical charge to be injected onto said floating gate, whereby the memory array may be selectively programmed and once programmed information may be read from the array.

2. The device defined in claim 1 wherein said floating gate of said storage device and said gate of said field effect transistor comprise a P-type polycrystalline silicon.

3. A memory array comprising:

a plurality of X lines;

a plurality of Y lines;

a plurality of memory cells each coupled between one of said X lines and one of said Y lines and each including a storage device having a pair of spaced-apart regions of a first conductivity type disposed in a substrate of a second conductivity type and a floating gate for receiving an electrical charge from said substrate, and a diode coupled in series with said storage device;

whereby voltages of sufficient magnitude may be applied to selected X lines and Y lines of said array to cause an avalanche condition in said storage devices, thereby permitting an electrical charge to be injected onto said floating gates for programming the array.

4. The device defined in claim 3 wherein said floating gate comprises a P-type polycrystalline silicon.

* * * * *